(12) United States Patent
Santhiveeran et al.

(10) Patent No.: US 9,052,965 B2
(45) Date of Patent: Jun. 9, 2015

(54) VIRTUAL MACHINE FOR EXECUTION ON MULTIPLE COMPUTING SYSTEMS

(75) Inventors: Soma Sundaram Santhiveeran, Fremont, CA (US); Robert Campbell, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 182 days.

(21) Appl. No.: 13/702,262

(22) PCT Filed: Jun. 10, 2010

(86) PCT No.: PCT/US2010/038173
§ 371 (c)(1),
(2), (4) Date: Dec. 5, 2012

(87) PCT Pub. No.: WO2011/155941
PCT Pub. Date: Dec. 15, 2011

(65) Prior Publication Data
US 2013/0074073 A1    Mar. 21, 2013

(51) Int. Cl.
*G06F 9/455* (2006.01)
*G06F 9/50* (2006.01)
*G06F 9/48* (2006.01)

(52) U.S. Cl.
CPC ............ *G06F 9/5077* (2013.01); *G06F 9/4856* (2013.01); *G06F 2009/4557* (2013.01); *G06F 9/45558* (2013.01)

(58) Field of Classification Search
None
See application file for complete search history.

(56) References Cited

U.S. PATENT DOCUMENTS

| | | | |
|---|---|---|---|
| 7,032,053 B2 | 4/2006 | Himmel et al. | |
| 7,257,811 B2 | 8/2007 | Hunt et al. | |
| 7,484,208 B1 * | 1/2009 | Nelson | 718/1 |
| 2005/0193144 A1 * | 9/2005 | Hassan et al. | 709/238 |
| 2006/0130060 A1 | 6/2006 | Anderson et al. | |
| 2007/0113228 A1 | 5/2007 | Raghunath et al. | |
| 2007/0180436 A1 | 8/2007 | Travostino et al. | |
| 2007/0266383 A1 | 11/2007 | White | |
| 2008/0016570 A1 | 1/2008 | Capalik | |
| 2008/0189432 A1 | 8/2008 | Abali et al. | |
| 2009/0210794 A1 | 8/2009 | Pendse et al. | |
| 2009/0288082 A1 * | 11/2009 | Nazeer et al. | 718/1 |
| 2010/0058106 A1 | 3/2010 | Srinivasan et al. | |
| 2010/0229180 A1 * | 9/2010 | Masuda | 718/105 |
| 2010/0250824 A1 * | 9/2010 | Belay | 711/6 |
| 2011/0208908 A1 * | 8/2011 | Chou et al. | 711/112 |

FOREIGN PATENT DOCUMENTS

| | | |
|---|---|---|
| CN | 101313277 A | 11/2008 |
| CN | 101410818 A | 4/2009 |

(Continued)

OTHER PUBLICATIONS

International Search Report and Written Opinion received in PCT Application No. PCT/US2010/038173, mailed on Mar. 1, 2011, 9 pages.

(Continued)

*Primary Examiner* — Sisley Kim
(74) *Attorney, Agent, or Firm* — Hewlett-Packard Patent Department

(57) ABSTRACT

A portable computing system can include a first virtue machine. The portable computing system can connect to a computing system. The computing system can access the virtual machine on the portable computing system.

11 Claims, 7 Drawing Sheets

(56) References Cited

FOREIGN PATENT DOCUMENTS

CN 101425021 A 5/2009
WO WO-2008/089480 A1 6/2008

OTHER PUBLICATIONS

Office Action, CN Application No. 201080067286.5, Date Issued: Aug. 29, 2014, pp. 1-11.

* cited by examiner

VIRTUAL MACHINE FOR EXECUTION ON MULTIPLE COMPUTING SYSTEMS

BACKGROUND

Portable computing system can be more convenient for a user that may need the use of the computing system away from an office. A portable computing system may have limited capabilities compared to another computing system. For example the processor of a portable computing system may not be able to perform the same tasks at the same speed as another computing system. The portable computing system may include less memory to store data on when operating the portable computing system as compared to another computing system. The portable computing system may also include a smaller display than the display of another computing system may.

BRIEF DESCRIPTION OF THE DRAWINGS

Some embodiments of the invention are described with respect to the following figures.

DETAILED DESCRIPTION

A portable computing system may include a battery and the components of the portable computing system can be optimized for the battery. A portable computing system can be for example a notebook computer, a personal digital assistant, a phone, or the like. The components may not have the same amount of processing capacity even when the portable computing system is connected to constant power source such as an alternating current wall outlet.

Another computing system such as a desktop computing system may include different components than the portable computing system. The components of the computing system may allow the computing system to perform tasks that the portable computing system cannot perform or perform slower than the computing system.

A user can transfer data from the portable computing system to the desktop computing system through a network or by storing the data on a storage device such as an optical disk or solid state drive such a universal serial bus storage drive. Transferring the data does not transfer the applications or the operating system that is on the portable computing device. The user would have to have two versions copies of all of their application and also two operating systems. If the portable computing system included a hypervisor the portable computing system could run an operating system as a virtual machine on the portable computing system. If the other computing system included a hypervisor the portable computing system could transfer the virtual machine to the hypervisor of the other computing system. The other computing system may perform the same tasks as the portable computing system on different components than those of the portable computing system.

In one embodiment, a portable computing system can include a first hypervisor and a first virtual machine. The portable computing system can connect to a computing system including computing system hardware. The portable computing system can include a port to establish a connection between the portable computing system and the computing system. The connection can be used for the computing system to access the first virtual machine and execute the first virtual machine on the computing system hardware.

Figure 1:
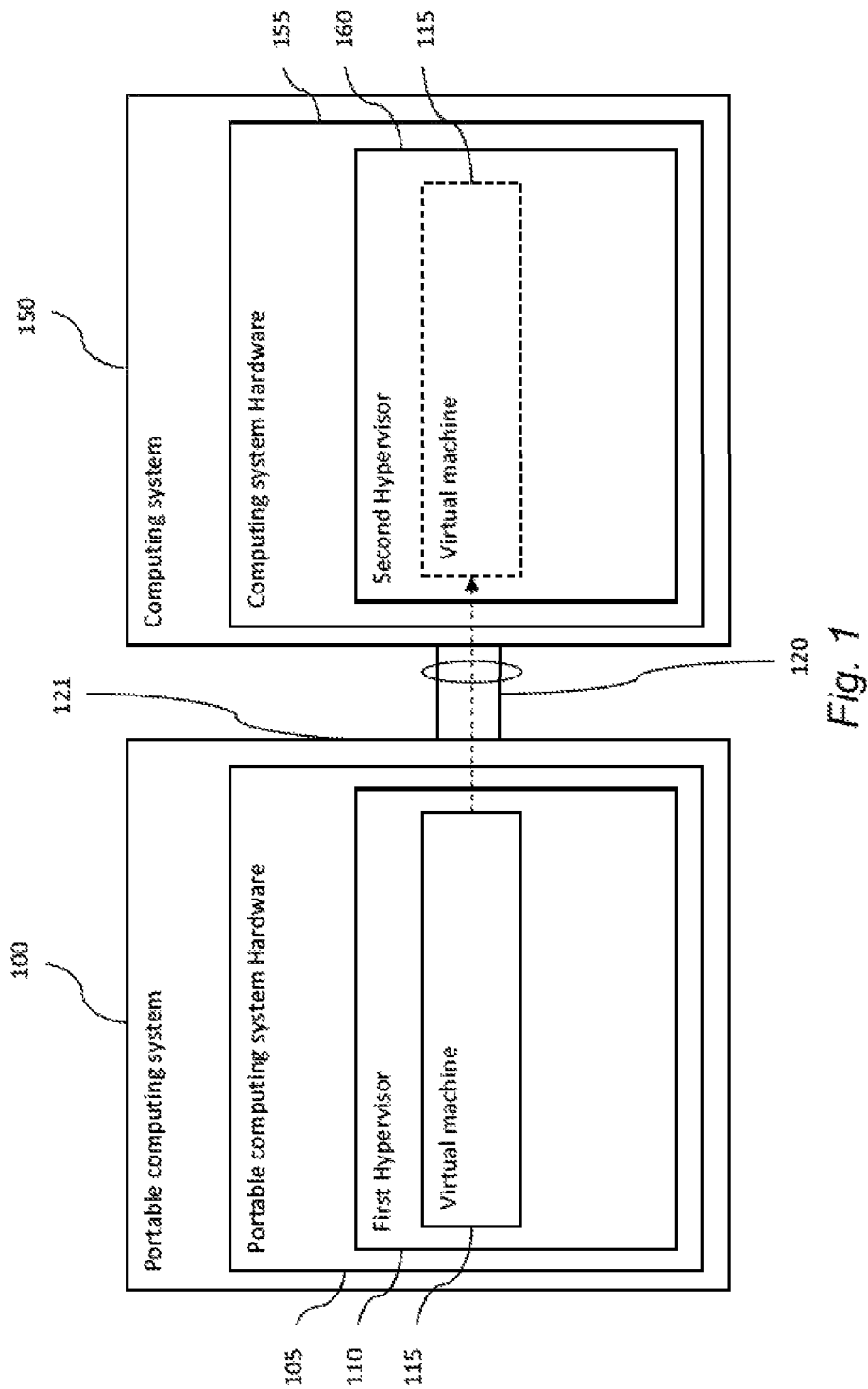
FIG. 1 is a block diagram of a portable computing system and a computing system according to an example embodiment of the invention.

With reference to the figures, FIG. 1 is a block diagram of a portable computing system and a computing system according to an example embodiment of the invention. The portable computing system includes hardware 105. The hardware 105 may include a processor, memory such as random access memory, a persistent storage such as a hard disk drive or a solid state disk, a network controller, a graphic controller, an input output controller or another component. A hypervisor 110 is an interface between a virtual machine 115 and the hardware 105. The virtual machine 115 can include an operating system. The operating system can be for example Windows from Microsoft, Linux, Unix, or another operating system.

The computing system 150 can include computing system hardware 155. The computing system hardware may include a processor, memory such as random access memory, a persistent storage such as a hard disk drive or a solid state disk, a network controller, a graphic controller, an input output controller or another component. The hardware on the computing system 150 may include different components from those in the portable computing system 100. For example some of the components in the portable computing system 100 may be designed to generate less heat than the components in the computing system 150.

The computing system 150 can be connected to the portable computing system 100 by a connection 120 to the port 121 on the portable computing system 100. The connection 120 may be a universal serial bus connection, an IEEE 1394 connection, an eSATA connection, a Ethernet connection, a 802.11 WiFi connection or any other connection to transmit data between a portable computing system 100 and a computing system 150. If there is a connection the computing system may access the computer readable media in the portable computing system 100. The computer readable media may be for example a hard drive, solid state drive, an optical drive, or another computer readable media. A second hypervisor can view the contents of the computer readable media and resume the virtual machine 115 on the computing system hardware 155. The computing system 150 may also duplicate the virtual machine 115 from the portable computing system 100 to the computing system 150 and then resume the virtual machine 115 on the computing system hardware 155.

If the computing system has access to the computer readable media of the portable computing system 100 then parts of the virtual machine 155 can be moved or copied to the computing system 150 and the computing system can access the remaining parts as the virtual machine 115 requests them. If the connection 120 is made then the portable computing system 100 or the computing system 150 may prompt that the connection is made and wait for a confirmation that the virtual machine should be run on the computing system hardware 155. The prompt may be for example a message on a display generated by the first hypervisor 110 if the message is on the portable computing system 100 and the message may be generated by the second hypervisor 160 if the message was on a display of the computing system 150. A user can confirm that the virtual machine 115 should be run on the computing system hardware 155 by a mouse click, a keyboard entry or another input device.

The portable computing system 100 can suspend the operations of the virtual machine 115 on the portable computing system 100 prior to the computing system 150 taking over the running of the virtual machine 115 so as not transferring or copying files that are not complete causing corrupt files to be received by the computing system 100.

Figure 2:
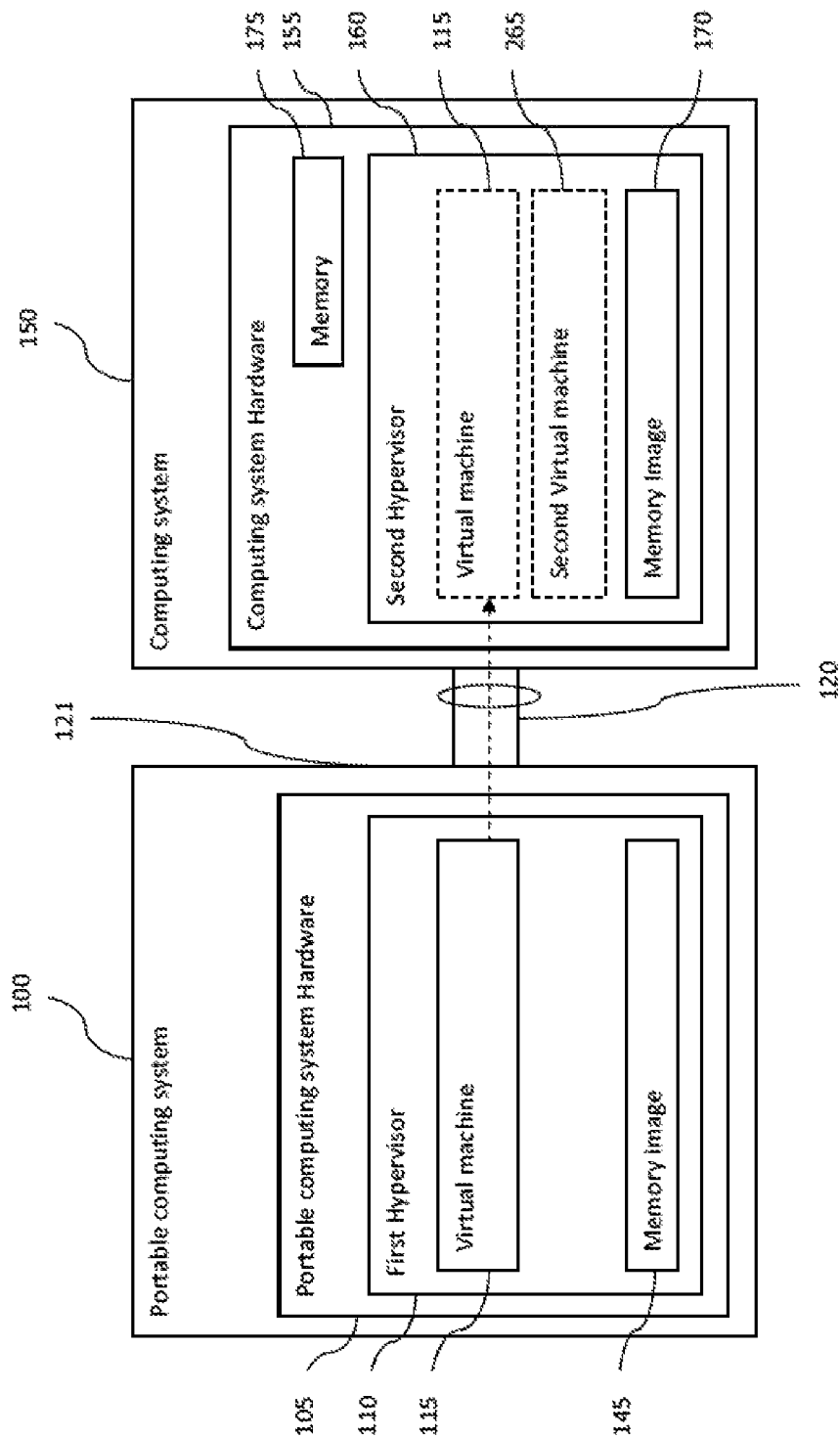
FIG. 2 is a block diagram of a portable computing system and a computing system according to an example embodiment of the invention.

FIG. 2 is a block diagram of a portable computing system and a computing system according to an example embodiment of the invention. If the connection 120 between the portable computing system 100 and the computing system 150 is going to be disconnected the portable computing system 100 the computing system can suspend the operation of the virtual machine 115 on the computing system 150. The signal to suspend the operation of the virtual machine 115 can originate with the portable computing system 100, the connection 120 or the computing system 150. For example if the user going to disconnect the portable computing system 100 from the computing system they may indicate to the portable computing system 100 that the connection 120 to the computing system 150 is going to be disconnected and that the virtual machine 115 operation on the computing system 150 should be suspended.

The virtual machine 115 can be using a memory image created by the hypervisor 160 on the computing system 150. The memory image 170 appears to the virtual machine 155 as physical memory 175 that is part of the computing system hardware 155. The memory image 170 can be, for example, a virtual random access memory that the virtual machine can read from and write to. If the virtual machine 115 is suspended on the computing system 150 a snap shot of the memory image, the virtual machine 115, or both can be generated by the computing system 150. The snap shot can be received by the portable computing system 100 and stored on the memory image 145 on the portable computing system 100.

The computing system 150 may retain some data that can facilitate the resuming of the virtual machine 115 if the portable computing system 100 is reconnected to the computing system 150. If the computing system 150 retains data then the computing system may 150 check for to the data retained when the portable computing system 100 is reconnected to the computing system 150.

The computing system 150 can include a second virtual machine 265 that may execute on the second hypervisor 160. The second hypervisor 160 can be switched between the virtual machine 115 and the second virtual machine 265. The second hypervisor 160 may suspend one of the virtual machine 115 and the second virtual machine 265 when switching to the one that was not executing. The second hypervisor 160 may be executing the virtual machine 115 and the second virtual machine 265 at the same time and the virtual machine 115 and the second virtual machine 265 may appear for example on an interface of the second hypervisor 160 to switch between the virtual machine 115 and the second virtual machine 265.

Figure 3:
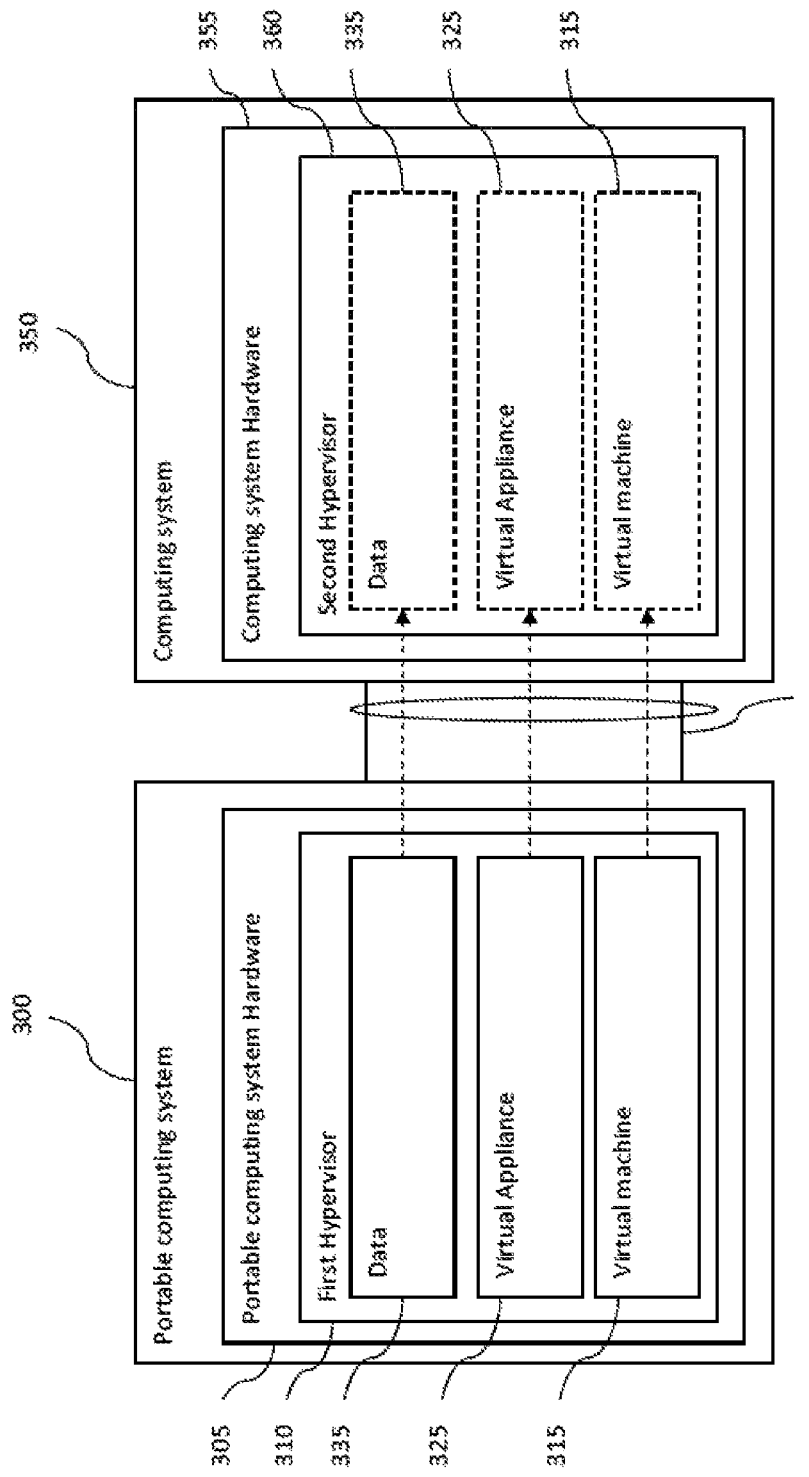
FIG. 3 is a block diagram of a portable computing system and a computing system according to an example embodiment of the invention.

FIG. 3 is a block diagram of a portable computing system 300 and a computing system 350 according to an example embodiment of the invention. The virtual machine 315 may be a generalized operating system that can perform tasks with the addition of applications. The applications may be virtual appliances 325. A virtual machine 315 with an operating system designed for a specific task may not use virtual appliances 325. The virtual appliance 325 may be an application such as a word processor, spreadsheet, game, or another application. The portable computing system can include the virtual appliance 325 and the portable computing system 300 can transfer the virtual appliance 325 from the portable computing system 300 to a computing system 350. The computing system 350 can run the virtual appliance 325 on the computing system 350.

In one embodiment the virtual machine 315 or the virtual appliance 325 are not changed by the computing system 350. The virtual machine 315 or the virtual appliance 325 may be transferred to the computing system 350 from the portable computing system 300 and the hypervisor can allow the virtual machine 315 or the virtual appliance 325 to operate on either the portable computing system hardware 305 or the computing system hardware 355. If the portable computing system 300 and the computing system 350 do not change the virtual machine 315 of the virtual appliance 325 then the virtual machine 315 or the virtual appliance can be transferred from the computing system 350 to the portable computing system 300 without transferring data if the portable computing system 300 retained a copy of the virtual machine 315 or the virtual appliance.

A user of the virtual machine 315 on the computing system 350 may want to access the data 335 that they access on the portable computing system 300. The data 335 may be for example text files, multimedia files, or another type of file. The data can be transmitted by the portable computing system 300 over the connection 320 to the computing system so that the user can use or change the data 335 with the virtual appliances 325 or the virtual machine 315 on the computing system. In one embodiment the data is retained on the portable computing system 300 and the computing system 350 accesses the data 335 over the connection 320 so that all the data 335 does not have to be transferred to the computing system 350. If the data 335 is transferred to the computing system 350 and the data 335 is changed on the computing system 350 then the data is copied back to the portable computing system 300 prior to disconnecting the connection 320 between the portable computing system 300 and the computing system 350.

Figure 4:
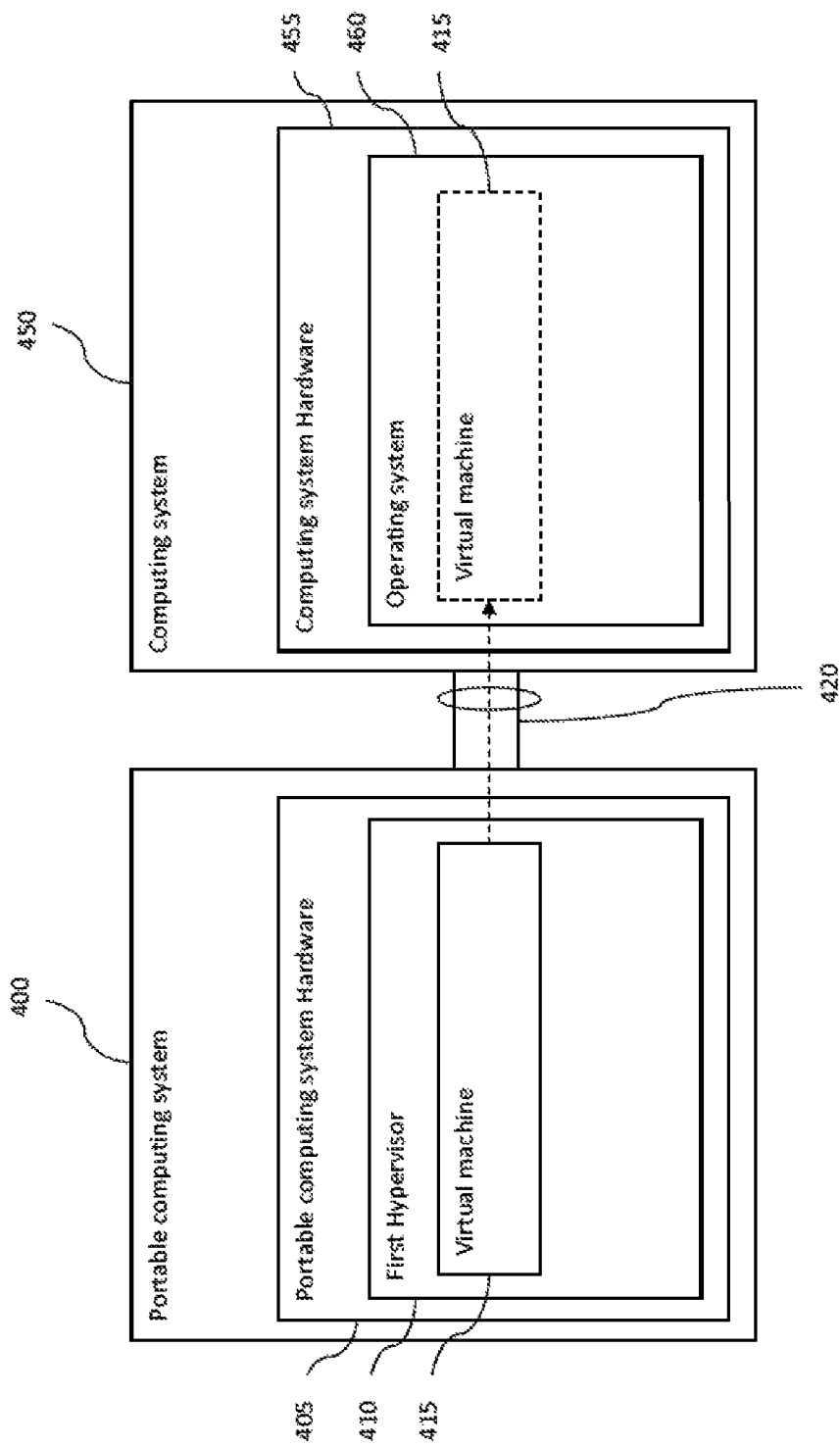
FIG. 4 is a block diagram of a portable computing system and a computing system according to an example embodiment of the invention.

FIG. 4 is a block diagram of a portable computing system 400 and a computing system 450 according to an example embodiment of the invention. The computing system 450 may include an operating system 460. The operating system 460 can be for example Windows® from Microsoft, Linux, or another operating system. The operating system may be operating on the computing system hardware 455.

The operating system 460 can mount the computer readable media of the portable computing system 400 if the portable computing system 400 is connected to the computing system 450 through connection 420. Mounting the computer readable media can be when the data on the computer readable media can become accessible to the system mounting the drive. For example the computer readable media may appear in the file manager of the computing system 450 as another drive in addition to the drives that are part of the computing system hardware 455.

The operating system can run the virtual machine 415 within the operating system 460. In one embodiment the virtual machine 415 may appear as program being executed by the operating system. The virtual machine 415 may appear in a window that can be minimized to an icon, maximized to the edges of a display or may be a portion of the display. The operating system 450 can execute programs while the virtual machine 415 is also executing on the computing system 450. A user of the computing system 450 can switch between the operating system 460, applications on the operating system, and the virtual machine 415.

If the portable computing system 400 is going to be disconnected from the computing system then the operating system 460 on the computing system can take a snap shot of the memory image and the virtual machine and transfer the snap shot back to the portable computing system 400. The computing system 450 can execute applications on the computing system 450 independent of the connection 420 to the portable computing system 400.

The snap shot of the virtual machine and the memory image on the computing system 450 may be completed and transferred back to the portable computing system at regular intervals. For example, the snap shot may be performed every 0.5 seconds and transferred to the portable computing system 400. The scheduled transfer of the snap shot can allow the portable computing system 400 to be disconnected from the computing system 450 unexpectedly and still not have a failure of the virtual machine 415 because it doesn't have the latest snap shot.

Figure 5:
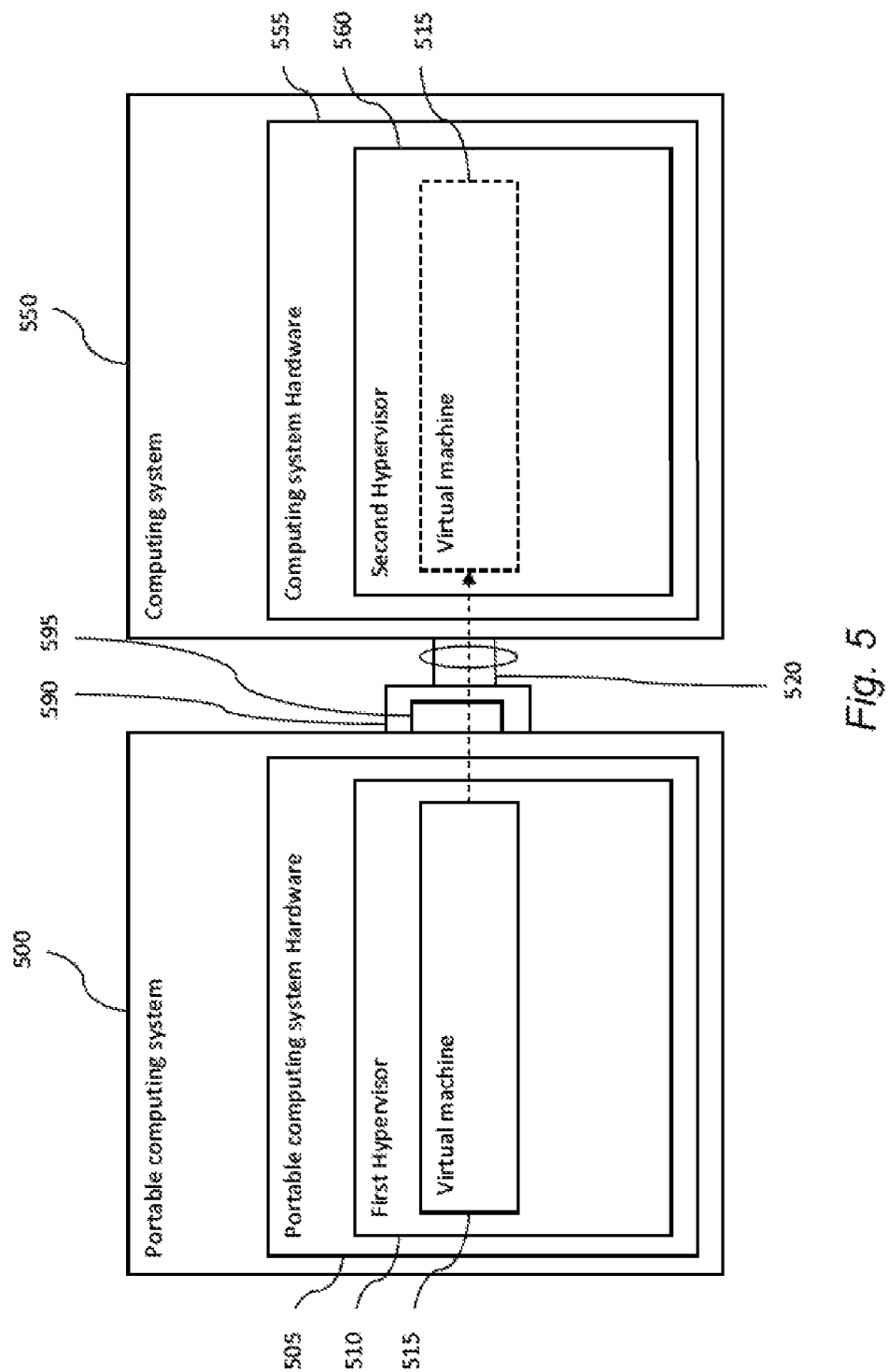
FIG. 5 is a block diagram of a portable computing system and a computing system according to an example embodiment of the invention.

FIG. 5 is a block diagram of a portable computing system 500 and a computing system 550 according to an example embodiment of the invention. The portable computing system 500 can be attached to a docking station 590. The docking station 590 can include a lock 595. The lock 595 may prevent the portable computing system 500 from disconnected from the docking station 590. The lock 595 may be released and allow the removal of the portable computing system 500 from the docking station 590 after the latest snap shot of the virtual machine 515, the memory image or both is transferred to the portable computing system 500. The docking station 590 can be connected to the connection 520 that also connects to the computing system 550 and the connection 520 can remain connected between the docking station 590 and the computing system 550 after the portable computing system 500 is removed from the docking station 590. The connection 520 can connect the computing system hardware 555 to the portable computing system hardware 505 if the portable computing system 500 is connected to the docking station 590.

If the virtual machine 515 is executing on the hypervisor 560 of the computing system 560 the lock 595 can prevent the system from being removed. If the system receives a signal to take a snap shot of the virtual machine 515, the memory image or both and transfer the virtual machine 515 back to the portable computing system for execution by the first hypervisor 510 on the portable computing system 500 and the transfer takes place, then the lock 595 may release the portable computing system 500 from the docking station 590.

Figure 6:
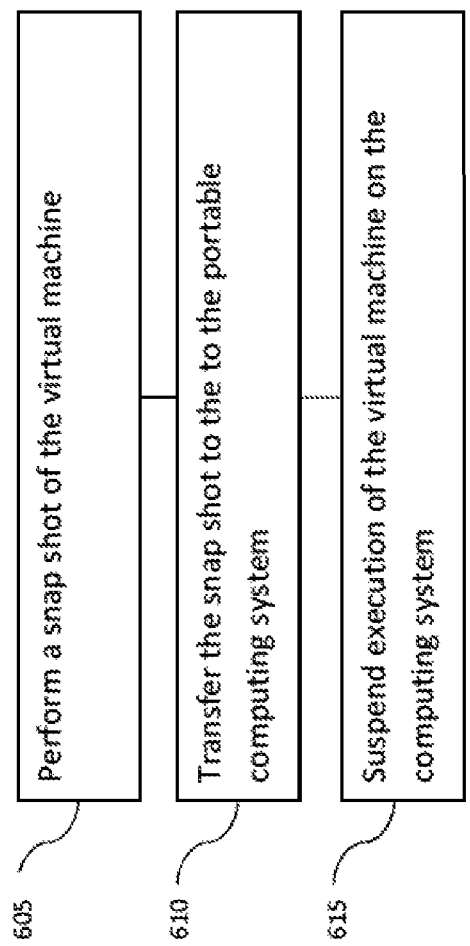
FIG. 6 is a flow chart according to an example embodiment of a method of the invention.

FIG. 6 is a flow chart according to an example embodiment of a method of the invention. The method begins by performing a snap shot of the virtual machine with the computing system executing the virtual machine at 605. Before executing the virtual machine the computing system may have accessed the portable computing system to retrieve the virtual machine. The snap shot of the virtual machine is transferred to the portable computing system at 610. The computing system can suspend execution of the virtual machine at 615. The suspension of the execution of the virtual machine can be after the snap shot so that the snap shot of the virtual machine includes the most recent changes made to the virtual machine prior to the snap shot.

Figure 7:
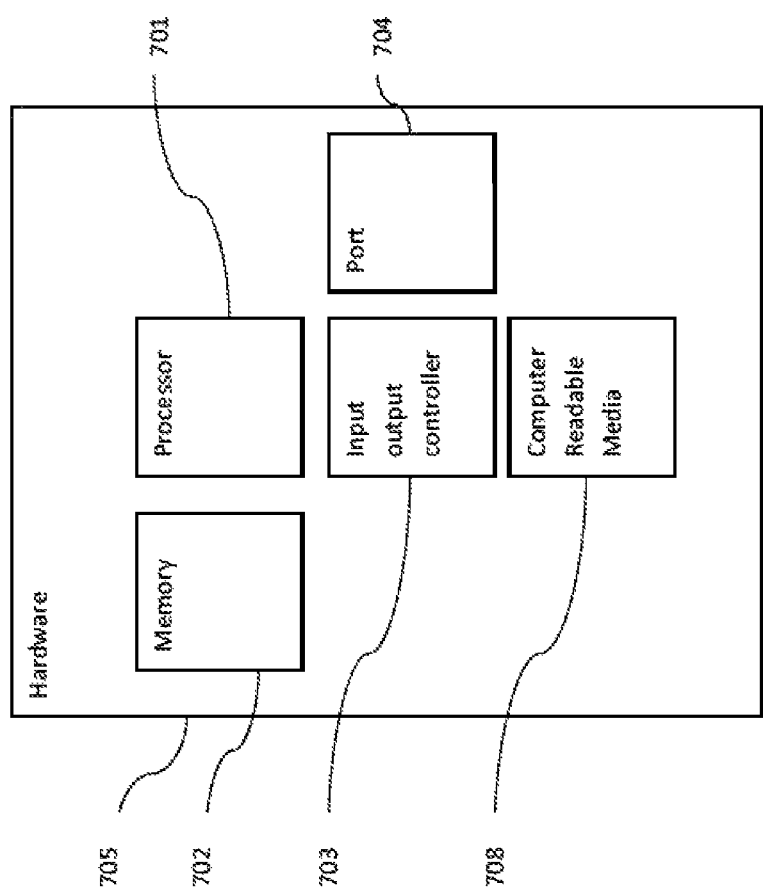
FIG. 7 is a block diagram of a portable computing system or a computing system according to an example embodiment of the invention.

FIG. 7 is a block diagram of hardware according to an example embodiment of the invention. The portable computing system or the computing system can include hardware 705. The hardware 705 can include a processor 701 to execute instructions. The instructions executed by the processor 701 can be supplied by a hypervisor or an operating system. The processor may include special instructions that can be used by a virtual machine to improve performance, for example by reducing the number of instructions from the hypervisor.

The processor 701 can connect to memory 702. The memory can be, for example, random access memory (RAM). The processor 701 can be connected to an input output controller 703. The input output controller 703 can include a connection to a port 704 for example an eSATA port, a network port such as ethernet or wifi, a universal serial bus (USB) or another port which can be used to connect the hardware to other hardware in another computing system.

The input output controller 703 may also include a controller 708 for a computer readable medium. The controller can be connected to the computer readable medium 708. The computer readable medium may be for example a hard drive, solid state storage drive, an optical disk or another non-transitory computer readable medium.

The techniques described above may be embodied in a computer-readable medium for configuring a computing system to execute the method. The computer readable media may include, for example and without limitation, any number of the following; magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store and/or transmit the software modules discussed here Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A portable computing device comprising:
   a first hypervisor executing a first virtual machine according to a set of executed instructions in order to cause the portable computing device to:
   establish a connection with a computing system, wherein the connection is made via a docking station, and wherein the docking station includes a lock to prevent the portable computing device from disconnecting with the docking station while the connection with the computing system is established;
   generate a prompt on the portable computing device that the connection is established and wait for a confirmation that the first virtual machine is to be executed by a second hypervisor of the computing system;

provide, via the connection, access to the first virtual machine to enable the computing system to execute the first virtual machine;

prevent disconnection with the computing system by using the lock when the first virtual machine is being executed by the second hypervisor of the computing system;

determine that the connection, between the portable computing device and the computing system, is to be disconnected;

in response to determining that the connection is to be disconnected, send a snap shot signal to the computing system to cause the computing system to generate a final snap shot of the first virtual machine, the final snap shot identifying most recent changes made to the first virtual machine;

based on sending the snap shot signal, receive the final snap shot from the computing system; and in response to receiving the final snap shot, release the lock and disconnect with the computing system.

2. The portable computing device of claim 1, wherein the portable computing device is to periodically receive a current snap shot of a memory image created by the second hypervisor of the computing system over the connection.

3. The portable computing device of claim 2, wherein the current snap shot of the memory image comprises a current snap shot of a virtual random access memory operable by the computing system executing the first virtual machine.

4. A method of executing a virtual machine executing on a portable computing device, the method performed by one or more processors of a computing system and comprising:

accessing the virtual machine on the portable computing device via an established connection, wherein the connection is made via a docking station, and wherein the docking station includes a lock to prevent the portable computing device from disconnecting with the docking station while the connection is established;

generating a prompt on the portable computing device that the connection is established and wait for a confirmation that the virtual machine is to be executed by a hypervisor of the computing system;

executing the virtual machine using the hypervisor;

prevent disconnection with the computing system using the lock when the virtual machine is being executed by the hypervisor of the computing system;

receiving a snap shot signal from the portable computing device indicative of suspending execution of the virtual machine;

in response to determining that the connection is to be disconnected, receiving the snap shot signal and generating a final snap shot of the virtual machine;

transferring the final snap shot of the virtual machine to the portable computing device; and in response to transferring the final snap shot, suspending execution of the virtual machine and causing the docking station to release the lock and disconnect with the portable computing device.

5. The method of claim 4, wherein executing the virtual machine comprises processing data from the virtual machine on hardware of the computing system before generating the final snap shot.

6. The method of claim 4, further comprising executing a second virtual machine on the computing system after the execution of the virtual machine is suspended.

7. The method of claim 4, wherein the snap shot signal indicates that the established connection is to be disconnected.

8. The method of claim 4, wherein the computing system generates a current snap shot according to a schedule.

9. The method of claim 8, wherein the computing system transfers the current snap shot to the portable computing device according to the schedule.

10. A non-transitory computer readable medium storing instructions that, when executed by a processor of a portable computing device, cause the portable computing device to:

establish a connection with a computing system, wherein the connection is made via a docking station, and wherein the docking station includes a lock to prevent the portable computing device from disconnecting with the docking station while the connection with the computing system is established;

generate a prompt on the portable computing device that the connection is established and wait for confirmation that a virtual machine of the portable computing device is to be executed by a hypervisor of the computing system;

provide, to the computing system via the connection, access to a execute the virtual machine on the portable computing device;

prevent disconnection with the computing system using the lock when the virtual machine is being executed by the hypervisor of the computing system;

determine that the connection, between the portable computing device and the computing system, is to be disconnected;

in response to determining that the connection is to be disconnected, send a snap shot signal to the computing system to cause the computing system to generate a final snap shot identifying most recent changes made to the virtual machine;

based on sending the snap shot signal, receive the final snap shot from the computing system; and in response to the receiving the final snap shot, release the lock and disconnect with the computing system.

11. The non-transitory computer readable medium of claim 10, wherein the portable computing device is to periodically receive a current snap shot of a memory image created by the hypervisor of the computing system over the connection.

* * * * *

UNITED STATES PATENT AND TRADEMARK OFFICE
CERTIFICATE OF CORRECTION

| | | |
|---|---|---|
| PATENT NO. | : 9,052,965 B2 | Page 1 of 1 |
| APPLICATION NO. | : 13/702262 | |
| DATED | : June 9, 2015 | |
| INVENTOR(S) | : Santhiveeran et al. | |

It is certified that error appears in the above-identified patent and that said Letters Patent is hereby corrected as shown below:

In the drawings

Drawing sheet 6 of 7, reference numeral 610, line 1, delete "to the to the" and insert -- to the --, therefor.

Signed and Sealed this
Sixteenth Day of February, 2016

Michelle K. Lee
*Director of the United States Patent and Trademark Office*